United States Patent [19]

Eto et al.

[11] Patent Number: 4,781,263
[45] Date of Patent: Nov. 1, 1988

[54] STEERING FORCE CONTROLLER FOR POWER STEERING DEVICE

[75] Inventors: Kunihiko Eto, Toyota; Yutaka Mori, Toyokawa; Akihiro Ohno, Okazaki, all of Japan

[73] Assignee: Toyoda Koki Kabushiki Kaisha, Kariya, Japan

[21] Appl. No.: 4,314

[22] Filed: Jan. 8, 1987

Related U.S. Application Data

[63] Continuation of Ser. No. 737,491, May 24, 1985, abandoned.

[30] Foreign Application Priority Data

May 31, 1984 [JP] Japan .................................. 59-112303

[51] Int. Cl.⁴ .............................................. B62D 5/06
[52] U.S. Cl. ................................. 180/143; 364/424.05
[58] Field of Search ............... 180/140, 140, 142, 143, 180/79; 74/388 PS; 364/424

[56] References Cited

U.S. PATENT DOCUMENTS

| 4,437,532 | 3/1984 | Nakamura et al. | 180/143 X |
| 4,476,529 | 10/1984 | Nakamura et al. | 180/142 X |
| 4,574,905 | 3/1986 | Asano et al. | 180/142 |
| 4,593,358 | 6/1986 | Takeshima et al. | 180/142 X |
| 4,602,695 | 7/1986 | Takeshima et al. | 180/79 X |
| 4,606,423 | 8/1986 | Fujiwara | 180/79.1 |
| 4,651,290 | 3/1987 | Masaki et al. | 180/143 X |

FOREIGN PATENT DOCUMENTS

| 0071909 | 2/1983 | European Pat. Off. | |
| 196477 | 10/1986 | European Pat. Off. | 180/79.1 |
| 79754 | 6/1980 | Japan | 180/142 |
| 209655 | 12/1983 | Japan | 180/142 |
| 59-92257 | 5/1984 | Japan . | |
| 149869 | 8/1984 | Japan | 180/79.1 |
| 157968 | 8/1985 | Japan | 180/79.1 |
| 255576 | 12/1985 | Japan | 180/142 |

Primary Examiner—John J. Love
Assistant Examiner—Mitchell J. Hill
Attorney, Agent, or Firm—Oblon, Fisher, Spivak, McClelland & Maier

[57] ABSTRACT

A steering force controller for an automobile power steering device includes a solenoid-operated valve openable and closable by a current applied to a solenoid thereof for controlling a fluid supplied under pressure to a power cylinder for operating steerable wheels, an automobile speed sensor for detecting a speed of travel of the automobile, a steering angle sensor for detecting a steering angle of the steering wheel and issuing a signal indicative of the detected steering angle, a discriminator for determining a running mode of the automobile from a variance of steering angle signals, and a control unit responsive to an output from the discriminator for controlling the current fed to the solenoid dependent on an input signal indicating the automobile speed, according to a respective one of different control patterns.

8 Claims, 6 Drawing Sheets (IA)  (IB)

(IIA)  (IIB)

(IIIA)  (IIIB)

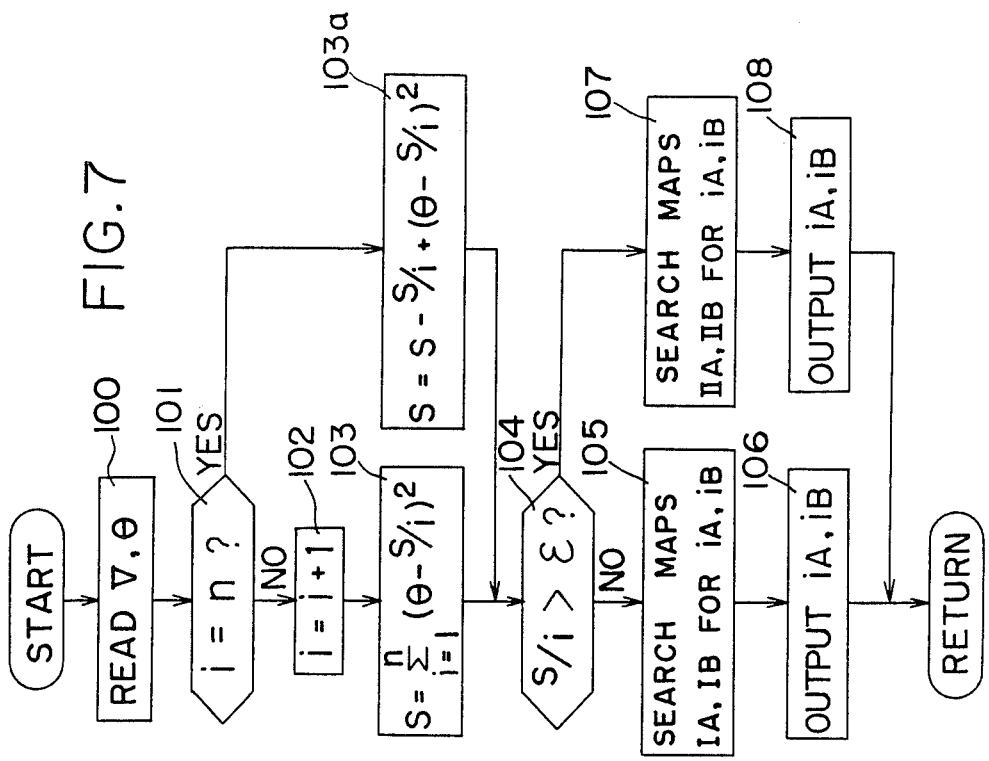
FIG. 7
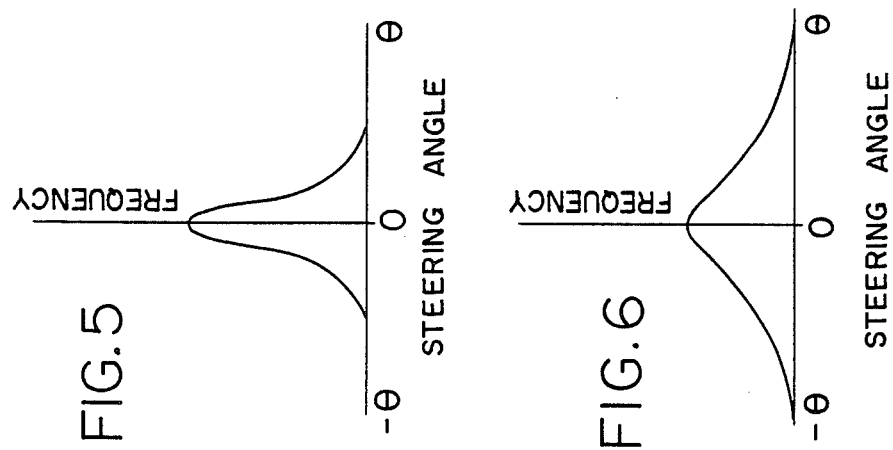
FIG. 5
FIG. 6

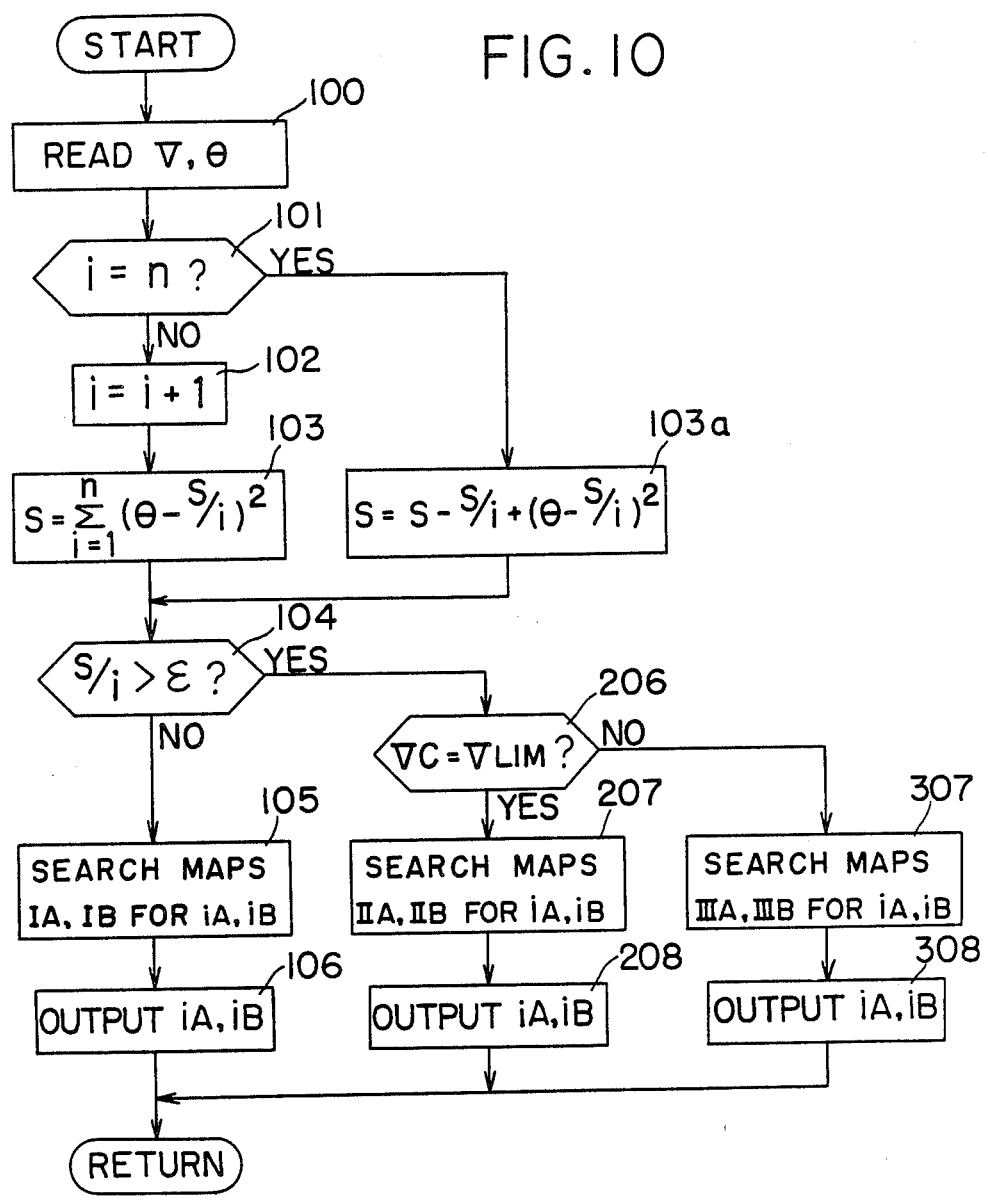

STEERING FORCE CONTROLLER FOR POWER STEERING DEVICE

This application is a continuation of application Ser. No. 737,491, filed May 24, 1985, now abandoned.

BACKGROUND OF THE INVENTION

1. Field of the Invention

The present invention relates to a steering force controller for a power steering device, and more particularly to a steering force controller for electronic control of the steering force of an automobile dependent on input signals representing an automobile speed and the like.

2. Description of the Prior Art

There is known an automobile power steering device capable of controlling the assisting action of a power cylinder in response to input signals indicative of an automobile speed and the like. The known power steering device effects optimum steering force control by allowing the steering wheel to be operated with a smaller force in a low speed range and requiring the steering wheel to be operated with a larger force in a high speed range.

The conventional power steering device controls the assisting force of the power cylinder according to a predetermined control pattern. Where the control pattern matches a high-speed running mode of an automobile, for example, it is not suitable for use in a running mode in a geographically mountainous area or on streets. Therefore, the prior power steering device fails to control the steering force in a manner to match every actual driving mode of the automobile, giving the driver a feel of unbalanced steering power control.

To solve the above problem, a device has been developed which select different assisting forces from a power cylinder to meet the driver's preference or a particular road condition. Since this device has to be manually operated to select a desired assisting force, the driver is required to act on the device each time he judges the road condition. It is therefore tedious and time-consuming to operate the device, or the device may be operated in error or may not be operated by oversight with no desired assisting force produced.

SUMMARY OF THE INVENTION

In view of the drawbacks of the conventional steering force controller, it is an object of the present invention to provide a steering force controller for controlling the steering force according to an optimum control pattern automatically selected dependent on an automobile running condition without requiring any control action on the part of the driver, thus preventing any control pattern from being selected in error or preventing a control pattern selection failure.

According to the present invention, a steering force controller includes a discriminator means for determining an automobile running condition or mode from a variance of steering angle signals, and a control unit responsive to an output from the discriminator means for a current fed to the solenoid of a solenoid-operated valve dependent on an input signal indicating an automobile speed or the like, according to a respective one of different control patterns.

With this arrangement, the automobile running condition such as a high-speed running mode or a running mode in a geographically mountainous region can be determined from the variance of steering angle signals. The control pattern for the current to be supplied to the solenoid can be varied by the determined running condition of the automobile, so that the current dependent on the running condition can be applied to the solenoid. When the control pattern for the solenoid current is thus varied, the driver can steer the automobile with the assisting force from a power cylinder which matches the actual running condition of the automobile.

The above and other objects, features and advantages of the present invention will become more apparent from the following description when taken in conjunction with the accompanying drawings in which preferred embodiment of the presents invention are shown by way of illustrative example.

BRIEF DESCRIPTION OF THE DRAWINGS

FIGS. 5 and 6 are graphs each illustrating a variance of steering angles;

FIG. 7 is a flowchart of a control program;

FIGS. 8 through 10 are flowcharts of control programs according to another embodiment of the present invention.

DESCRIPTION OF THE PREFERRED EMBODIMENTS

Figure 1:
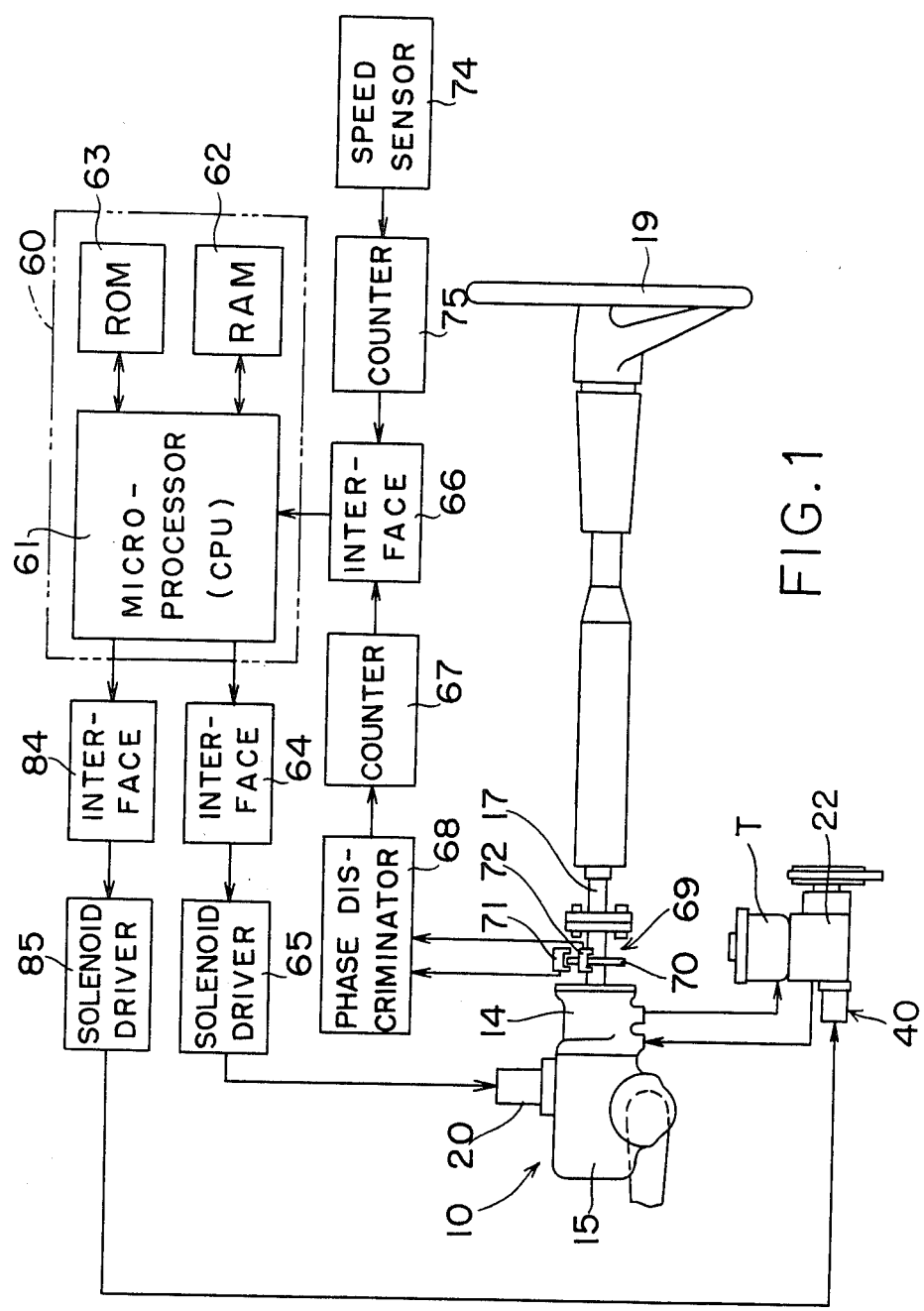
FIG. 1 is a block diagram, partly in elevation, of a steering force controller according to the present invention.

As shown in FIG. 1, a power steering device 10 is composed of a servovalve 14 and a power cylinder 15. The servovalve 14 is coupled by a steering shaft 17 to a steering wheel 19. The power cylinder 15 is coupled by a steering link mechanism (not shown) to steerable wheels. When the steering wheel 19 is manually turned under a steering torque applied to turn the servovalve 14, a fluid under pressure is supplied to and discharged from the power cylinder 15 which then transmits an increased steering torque to the steerable wheels.

To the power steering device 10, there is connected a pump 22 operated through a belt drive by the automobile engine to supply the fluid under pressure to the power steering device 10.

Figure 2:
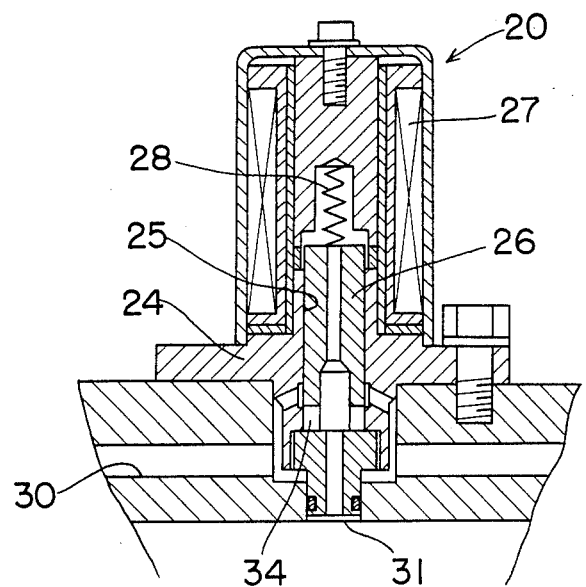
FIG. 2 is a cross-sectional view of a solenoid-operated valve for controlling communication between the opposite end chambers of a power cylinder.

A solenoid-operated valve 20 is mounted on the power cylinder 15 for controlling the fluid pressure from the pump 22 by introducing part of the fluid supplied into one chamber in the power cylinder 15 into the other chamber therein. As illustrated in FIG. 2, the solenoid-operated valve 20 comprises a valve housing 24, a spool 26 slidably fitted in a bore 25 in the valve housing 24, and a solenoid 27 mounted on the valve housing 24. The spool 26 is normally urged toward a lower stroke end under the biasing force of a spring 28 to keep a passage 30 leading to the lefthand chamber in the power cylinder 15 out of fluid communication with a passage 31 leading to the righthand chamber in the power cylinder 15.

When the solenoid 27 is energized to attract the spool 26, the spool 26 is displaced upwardly against the force of the spring 28 to provide fluid communication between the passages 30, 31 via a bypass slit 34.

Figure 3:
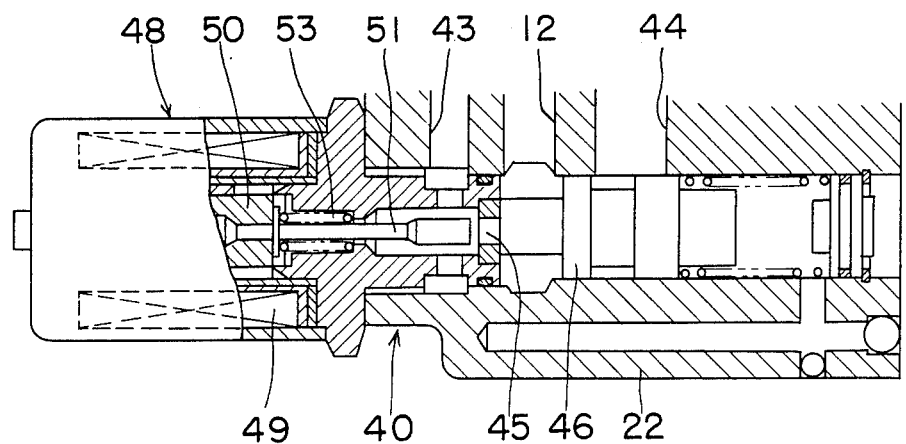
FIG. 3 is a cross-sectional view of a solenoid-operated valve for controlling the rate of flow toward a servovalve.

The pump 22 is associated with a flow control valve 40 for controlling the rate of flow from the pump 22. More specifically, as shown in FIG. 3, the flow control valve 40 is composed of a restriction 45 for controlling the fluid under pressure flowing from an outlet port 12 to a delivery port 43 of the pump 22, a spool valve member 46 slidable under the pressure across the restriction 45 for opening and closing a bypass hole 44 to control the rate of the fluid flow to the servovalve 14, and a solenoid-operated valve 48 mounted in coaxial relation to the spool valve member 46 for adjusting the opening of the restriction 45. The solenoid-operated valve 48 comprises a solenoid 49, a movable spool 50 axially displaceable in response to energization of the solenoid 49, and a valve shank 51 securely coupled to the movable spool 50. The movable spool 50 and the valve shank 51 are normally urged to move to the left (FIG. 3) by a spring 53 for fully opening the restriction 45. As the movable spool 50 is moved to the right against the resiliency of the spring 53 when the solenoid 49 is energized, the valve shank 51 is moved toward the restriction 45 to narrow the opening thereof, thus reducing the rate of flow from the delivery port 43 to the servovalve 14.

FIG. 1 also illustrates an electronic control unit 60 composed mainly of a microprocessor 61, a RAM (random-access memory) 62, and a ROM (read-only memory) 63. The microprocessor 61 is connected through interfaces 64, 84 to solenoid drivers 65, 85 for respectively controlling the currents supplied to the solenoids 27, 49 of the solenoid-operated valves 20, 48. The microprocessor 61 is also coupled through an interface 66, a counter 67, and a phase discriminator 68 to a steering angle sensor 69 composed of a rotary disc 70 coupled to the steering shaft 17 and two photointerrupters 71, 72, which produce a signal for detecting a steering angle $\theta$. The microprocessor 61 is also coupled via the interface 66 and a counter 75 to an automobile speed sensor 74 which comprises a revolution indicator coupled to the output shaft of the transmission for producing a pulse signal, the frequency of which is employed to detect the automobile speed V. Thus, the microprocessor 61 acts as a calculation means to read the signals from the steering angle sensor and the automobile speed sensor, and read the memory stored in RAM 62 and ROM 63 and send a signal to the respective solenar driver 65, 85 to control the respective solenoid operated valves 20, 48.

Figure 4A:
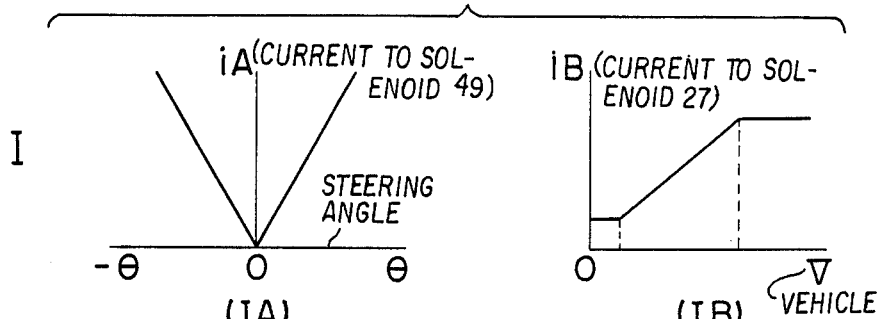
FIGS. 4a–c are a diagram showing the patterns of currents supplied to the solenoids of the solenoid-operated valves.
Figure 4B:
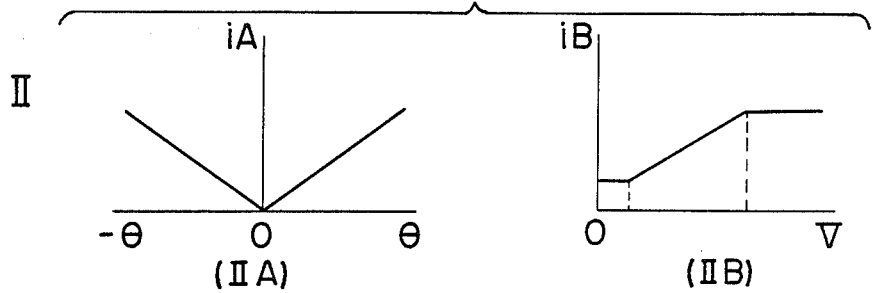
Figure 4C:
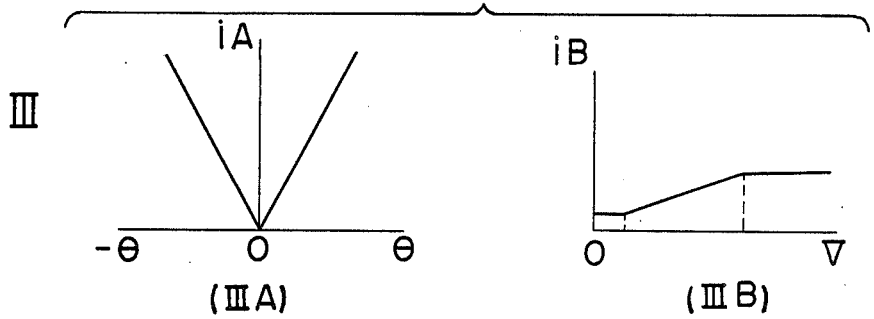

The ROM 63 stores as characteristic maps control patterns for currents to be applied to the solenoids 27, 49 of the solenoid-operated valves 20, 48. The control patterns include, as shown in FIG. 4c, a control pattern I that is a combination of characteristic maps IA, IB for use in a high-speed running mode, and a control pattern II, as shown in FIG. 4b, that is a combination of characteristic maps IIA, IIB for use in a running mode in a geographically mountainous region. The characteristic maps IA, IIA are used for driving the solenoid of the solenoid-operated valve 40 to control the rate of fluid flow to the servovalve 14, and the characteristic maps IB, IIB are used for driving the solenoid of the solenoid-operated valve 20 to control the communication between the chambers of the power cylinder 15.

In the control pattern I, the current iB to be applied to the solenoid 27 varies at a relatively large rate with respect to the automobile speed V, and the current iA to be applied to the solenoid 49 varies at a relatively large rate with respect to the steering angle $\theta$. This control pattern I is suitable for the high-speed running mode since the bypassing fluid flow in the power cylinder 15 is increased and the fluid flow supplied to the servovalve 14 is reduced, thereby requiring a large manual force to turn the steering wheel 19. In the control pattern II, the current iB to be applied to the solenoid 27 varies at a relatively small rate with respect to the automobile speed V, and the current iA to be applied to the solenoid 49 varies at a relatively small rate with respect to the steering angle $\theta$. This control pattern II is suitable for the geographically mountainous region running mode since the bypassing fluid flow in the power cylinder 15 is reduced and the fluid flow supplied to the servovalve 14 is increased, thereby requiring a small manual force to turn the steering wheel 19.

Another control pattern III, as shown in FIG. 4c, for use in a street running mode may also be employed as will be described later on.

The RAM 62 stores a control program for successively storing steering angles $\theta$ and determining whether the automobile is in the high-speed running mode or the geographically mountainous running mode based on the variance of the stored steering angles, and for selecting control patterns for the currents iA, iB to be supplied to the solenoid-operated valves 20, 40. FIGS. 5 and 6 illustrate variances of the steering angles $\theta$. In the high-speed running mode, the steering wheel is turned many times through small steering angles at a variance as illustrated in FIG. 5. In the geographically mountainous running mode, the steering angle is turned many times through large steering angles at a variance as shown in FIG. 6. As the control program is executed, the running mode of the automobile is automatically determined from the variance of the steering angles $\theta$ to select either the control pattern I or II (FIG. 4) based on the determined running mode.

Operation of the steering force controller will be described with reference to the control program shown in FIG. 7.

The steering angle $\theta$ which varies from time to time while the automobile runs in a running mode is detected by the steering angle sensor 69 and applied through the phase discriminator 68 to the counter 67. The automobile speed V detected by the automobile speed sensor 74 is applied to the counter 75.

When a signal is applied to the signal reading means or microprocessor 61, the microprocessor executes processing steps based on the program. The microprocessor 61 reads the signal, such as an interrupt signal, signifying the steering angle $\theta$ and the automobile speed V from the counters 67, 75 and stores them in an internal register in a step 100. Then, the microprocessor 61 compares the content i of a sampling counter C with a preset number n in a step 101. Since no sampling is effected at the time of starting of the operation, the content i is 0. In a step 102, the content i of the sampling counter C is incremented by 1.

In a step 103, the variance S of the steering angles $\theta$ is computed by the following equation:

$$S = \sum_{i=1}^{n} (\theta - S/i)^2$$

where $\theta$ is the steering angle detected at this time, and S/i is the average value of the variances S of the steering angles $\theta$ up to now. The variance S of the steering angles $\theta$ can be found by adding the squares of the differences between the steering angle $\theta$ and the average of the variances each time the steering angle is sampled to provide a plurality of calculated variances of the steering angle signals.

The variance S is then divided by the sampling number (content of sampling counter) i to produce the variance average S/i thus far, and the variance average S/i is compared with a reference value $\epsilon$ in a step 104 to incorporate a first and second decision mode for determining the running mode of the automobile. If S/i<$\epsilon$, then the steering angles $\theta$ have a variance as shown in FIG. 5, and the running mode is judged as the high-speed running mode. If S/i>$\epsilon$, then the steering angles $\theta$ have a variance as shown in FIG. 6, and the running mode is judged as the mountainous region running mode.

If in the high-speed running mode, then the program goes to steps 105, 106 to determine the currents iA, iB from the characteristic maps IA, IB and apply the currents iA, iB to the solenoids 49, 27 of the solenoid-operated valves 48, 20. Since the currents iA, iB vary at large rates, the bypassing fluid flow rate is large in the power cylinder 15 and the rate of fluid flow to the servovalve 14 is low, with the result that the steering wheel 19 requires a larger manual force to be turned.

If in the mountainous region running mode, then the program goes to steps 107, 108 to determine the currents iA, iB from the characteristic maps IIA, IIB and apply the currents iA, iB to the solenoids 49, 27 of the solenoid-operated valves 48, 20. Since the currents iA, iB vary at small rates, the bypassing fluid flow rate is low in the power cylinder 15 and the rate of fluid flow to the servovalve 14 is high, with the result that the steering wheel 19 requires a smaller manual force to be turned.

Each time an interrupt signal is applied, the microprocessor 61 repeatedly executes the steps 100 through 104 and the steps 105, 106 or 107, 108 to give a manual force setting for turning the steering wheel 19 dependent on the running mode of the automobile.

As the above processing steps are repeatedly executed, the values of the steering angle $\theta$ are accumulated to increase the variance S until finally it cannot properly be judged. To avoid this, the variance S is computed by the following equation in the step 101 after the steering angle has been sampled n times:

$$S = S - S/i + (\theta - S/i)^2$$

According to the above equation, $(\theta - S/i)^2$ is added as new variance data to the variance S obtained thus far, and the variance average S/i produced thus far as old variance data is subtracted. Through this processing step, part of the old variance data is replaced with new variance data after the steering angel has been sampled n times, to thereby find an accurate variance S.

Thereafter, the steps 104, 105, 106 or 104, 107, 108 are carried out as in the case where the steering angle is sampled less than n times, to control the steering force dependent on the running condition of the automobile.

Although in the foregoing embodiment there are two control patterns involved for the high-speed running mode and the mountainous region running mode, various other control patterns such as for a street running mode may be added so that one of such control patterns may be selected which matches the actual running condition of the automobile.

The variance of steering angles in the street running mode is similar to that in the mountainous region running mode. However, the street running mode can easily be discriminated from the mountainous region running mode by detecting how many times the automobile has stopped while travelling over a certain distance.

Figure 8:
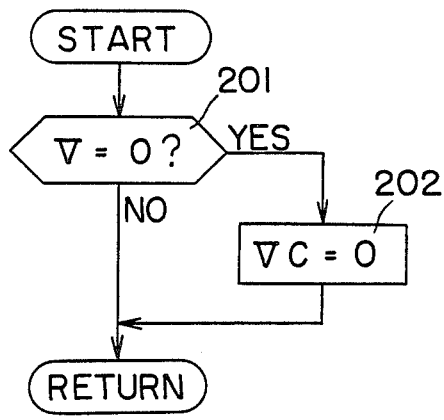
Figure 9:
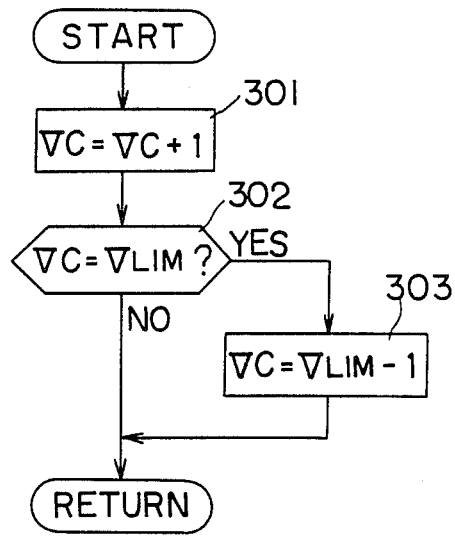

FIGS. 8 through 10 show processing steps for discriminating between the high-speed running mode and the mountainous region running mode. When an interrupt signal is applied in each unit time, the microprocessor 61 executes a step 201 (FIG. 8) to ascertain if the automobile speed V is nil or not. If nil, then the content of an automobile speed counter VC is cleared to zero in a step 202, and if not nil, then a next interrupt signal is awaited without varying the content of the automobile speed counter VC.

Figure 11:
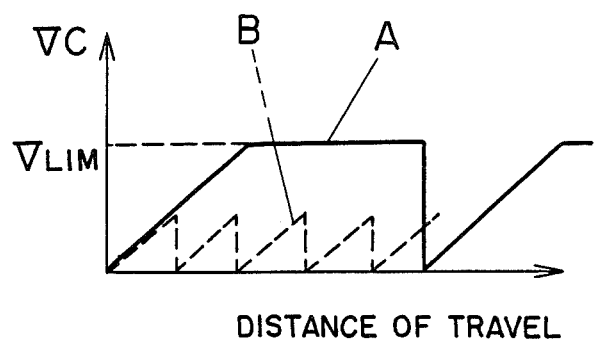
FIG. 11 is a graph showing the content of an automobile speed counter.

When an interrupt signal is applied in each tim the automobile travels a unit distance, the microprocessor 61 executes a step 301 (FIG. 9) to increment the content of the automobile speed counter VC by "1". Then, the microprocessor 61 compares the content of the automobile speed counter VC with a preset valve $V_{LIM}$. While the automobile runs in a mountainous region, it does not stop often, and the content of the automobile speed counter VC is progressively increased as shown in FIG. 11 at A. In the street running mode, however, the automobile stops frequently, and the automobile speed counter VC is reset to nil each time the automobile stops as shown in FIG. 11 at B. Therefore, if the content of the automobile speed counter VC coincides with the preset value $V_{LIM}$, then the running mode is judged as the mountainous region running mode. If not, then the running mode is judged as the street running mode. When the content of the automobile speed counter VC coincides with the preset value $V_{LIM}$, the program goes to a step 303 in which a value obtained by subtracting "1" from the preset value $V_{LIM}$ is stored as the content of the automobile speed counter VC. As a consequence, the content of the automobile speed counter VC is not increased beyond the preset value $V_{LIM}$.

FIG. 10 is a flowchart of processing steps for controlling the solenoid-operated valves 20, 48 in the street running mode. The steps 100 through 106 are the same as those shown in FIG. 7. A step 206 compares the content of the automobile speed counter VC with the preset value $V_{LIM}$. If they coincide, then the running mode is the mountainous region running mode. Then, the characteristic maps IIA, IIB for the mountainous region running mode are selected in a step 207 and the currents iA, iB therefor are applied in a step 208. If content of the automobile speed counter VC is smaller than the preset value $V_{LIM}$, then the running mode is the street running mode. Then, the characteristic map IIIA, IIIB for the street running mode are selected in a step 307 and the currents iA, iB therefor are applied in a step 308. The values of the currents iA, iB in the illustrated characteristic maps are given by wa of example only, and the illustrated characteristic maps are not optimum in the respective running modes, but may be replaced with other appropriate characteristic maps.

While in the foregoing embodiments the control pattern for the high-speed running mode is composed of a combination of the two characteristic maps of the automobile speed V and the steering angle $\theta$, the present invention is not limited to these characteristic maps only. The characteristic map of an angular velocity signal $\theta$ may also be added, or the steering angle signal may be omitted and only a number of characteristic maps of automobile speeds V may be provided which may be selected for steering force control.

In the illustrated embodiment, the solenoid-operated valve 20 for controlling the fluid communication between the chambers in the power cylinder 15 is controlled by the automobile speed V, and the solenoid-operated valve 48 for controlling the rate of fluid flow to the servovalve 14 is controlled by the steering angle signal $\theta$. However, the solenoid-operated valve 48 may be controlled by the automobile speed V and the solenoid-operated control valve 20 may be controlled by the steering angle $\theta$, or only one of the solenoid-operated valves 20, 48 may be used for steering force control.

In the illustrated embodiment, the characteristic maps of the control patterns are stored as data in the ROM 63. However, a computation program may be stored in the ROM 63 to compute the characteristic maps which are used to determine currents to be applied to the solenoid-operated valves.

Although certain preferred embodiments have been shown and described, it should be understood that many changes and modifications may be made therein without departing from the scope of the appended claims.

What is claimed is:

1. A steering force controller for a power steering device in an automobile having a servovalve actuatable by a manual torque applied to a steering wheel for supplying fluid under pressure from a pump selectively to a pair of chambers defined in a power cylinder operatively coupled to steerable wheels, said steering force controller comprising:
   solenoid-operated valve means operable in response to current applied to solenoid means thereof for controlling fluid under pressure supplied to said power cylinder;
   a steering angle sensor for detecting the steering angle of said steering wheel so as to output signals indicative of the detected steering angle;
   signal reading means for reading said output signals from said steering angle sensor at a predetermined frequency;
   calculation means for statistically calculating the variance of a plurality of said steering angle signals read by said signal reading means;
   discrimination means for determining a running mode of said automobile based upon the variance calculated by said calculation means; and
   control means connected to said solenoid means for controlling the current applied to said solenoid means based upon a control pattern corresponding to said running mode determined by said discrimination means.

2. A steering force controller as set forth in claim 1, wherein:
   said discrimination means determines the running mode of said automobile as a high speed driving mode when said variance of said steering angle signals calculated by said calculation means is smaller than a predetermined value and as a mountainous region driving mode when the variance of said steering angle signals is larger than said predetermined value.

3. A steering force controller as set forth in claim 2, wherein said calculation means is operable each time said steering angle signal is read by said signal reading means, for calculating a new variance of said steering angle signals based upon a steering angle signal newly read by said signal reading means and variances of said steering angle signals previously calculated by said calculation means; and said discriminating means comprises:
   comparison means for comparing said new variance calculated by said calculation means with said predetermined value so as to determine the running mode of said automobile as either of said high speed and mountainous region driving modes.

4. A steering force controller as set forth in claim 3, wherein an automobile speed sensor is further provided for detecting the driving speed of said automobile so as to output a signal indicative of the detected driving speed, wherein said signal reading means is further operable to read the driving speed signal from said automobile speed sensor at said predetermined frequency, and wherein said control means comprises:
   memory means for storing control patterns respectively corresponding to said high speed and mountainous region driving modes;
   search means for searching said memory means for one of said control patterns corresponding to one of said high speed and mountainous region driving modes determined by said comparison means, each of said control patterns defining various currents respectively relating to various driving speeds of said automobile; and
   solenoid drive means for applying to said solenoid means one of said various currents defined in said one of said control patterns searched by said search means and relating to the driving speed detected by said automobile speed sensor.

5. A steering force controller as set forth in claim 1, wherein said discrimination means determines the running mode of said automobile as:
   a high speed driving mode when the variance of said steering angle signals is smaller than a predetermined value;
   a mountainous region driving mode when the variance of said steering angle signals is larger than said predetermined value and said automobile is not stopped through a predetermined distance; and
   a street driving mode when the variance of said steering angle signals is larger than said predetermined value and said automobile is stopped within said predetermined distance.

6. A steering force controller as set forth in claim 5, wherein said calculation means is operable each time said steering angle signal is read by said signal reading means, for calculating a new variance of said steering angle signals based upon said steering angle signal newly read by said signal reading means and previously variances of said steering angle signals previously calculated by said calculation means; and said discrimination means comprises:
   first mode decision means for determining the running mode of said automobile as said high speed driving mode when said new variance calculated by said calculation means is smaller than said predetermined value; and
   second mode decision means for determining the running mode of said automobile as said mountainous region driving mode when said new variance is larger than said predetermined value and said automobile is not stopped through a predetermined distance and as said street driving mode when said new variance is larger than said predetermined value and said automobile is stopped in said predetermined distance.

7. A steering force controller as set forth in claim 6, wherein an automobile speed sensor is further provided for detecting the driving speed of said automobile so as to output a signal indicative of the detected driving speed, wherein said signal reading means is further operable to read the driving speed signal from said automobile speed sensor at said predetermined frequency, and wherein said control means comprises:

memory means for storing control patterns respectively corresponding to said high speed, mountainous region and street driving modes;

search means for searching said memory means for one of said control patterns corresponding to one of said high speed, mountainous region and street driving modes determined by said first and second mode decision means, each of said control patterns defining various currents respectively relating to various driving speeds of said automobile; and solenoid driving means for applying to said solenoid means one of said various currents defined in said one of control patterns searched by said search means and relating to the driving speed detected by said automobile speed sensor.

8. A steering force controller as set forth in claim 1, further comprising:

an automobile speed sensor for detecting the driving speed of said automobile;

said control means being operable for controlling the current applied to said solenoid means based upon said control pattern and said driving speed detected by said automobile speed sensor.

* * * * *